No. 771,291. PATENTED OCT. 4, 1904.
J. ZALIKOWSKI.
MANGLE.
APPLICATION FILED NOV. 23, 1903.
NO MODEL.
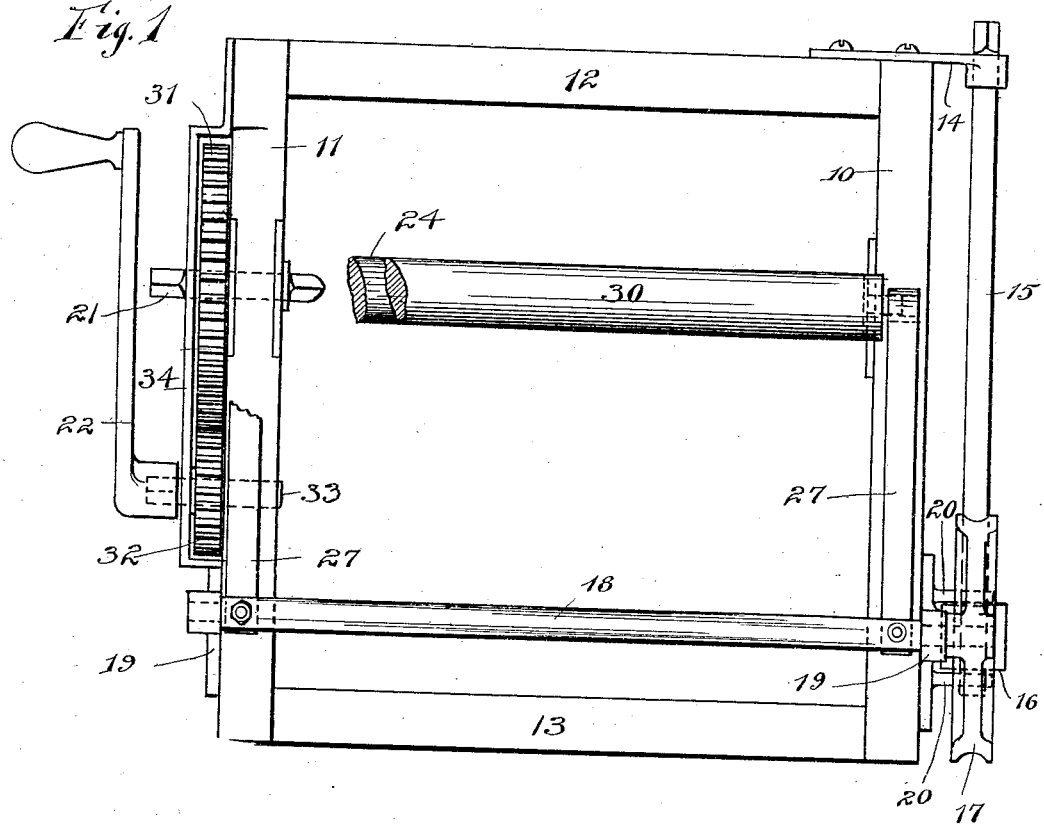
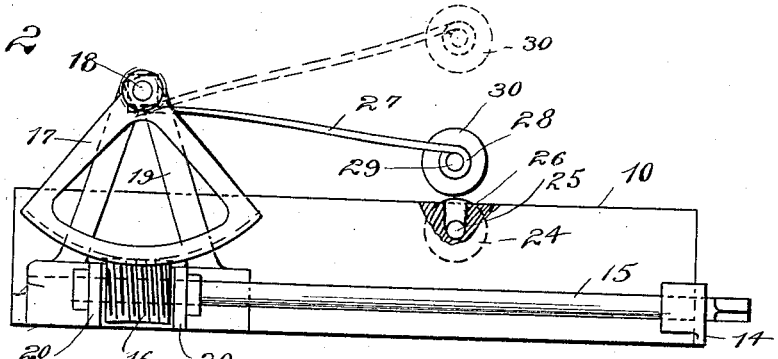
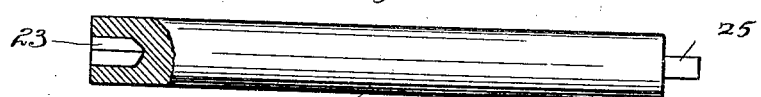
Witnesses: G. S. Noble, A. Gustafson
Inventor: John Zalikowski
By Chas. C. Tillman, Att'y.

No. 771,291.

Patented October 4, 1904.

UNITED STATES PATENT OFFICE.

JOHN ZALIKOWSKI, OF CHICAGO, ILLINOIS.

MANGLE.

SPECIFICATION forming part of Letters Patent No. 771,291, dated October 4, 1904.

Application filed November 23, 1903. Serial No. 182,274. (No model.)

*To all whom it may concern:*

Be it known that I, JOHN ZALIKOWSKI, a citizen of the United States, residing at Chicago, in the county of Cook and State of Illinois, have invented certain new and useful Improvements in Mangles, of which the following is a specification.

This invention relates to improvements in a device to be used for pressing and smoothing various articles, such as sheets, table-cloths, towels, bedspreads, and the like; and it consists in certain peculiarities of the construction, novel arrangement, and operation of the various parts thereof, as will be hereinafter more fully set forth and specifically claimed.

The main object of my invention is to provide a mangle which shall be portable and may be supported upon a suitable frame, table, or other support and which shall be simple and inexpensive in construction and so made that one of the compressing-rollers will be spring-actuated and adjustably held with relation to the other roller, so as to permit of the passage therebetween of clothes or garments of different thicknesses and so as to prevent the crushing of buttons on the garments.

In order to enable others skilled in the art to which my invention pertains to make and use the same, I will now proceed to describe it, referring to the accompanying drawings, in which—

Figure 1 is a plan view of a mangle embodying my invention, showing a part of the compressing-rollers broken away to illustrate the manner of detachably connecting one of them to the main frame. Fig. 2 is a view in side elevation of the mangle, showing the means for adjusting the upper or adjustable roller; and Fig. 3 is a view, partly in elevation and partly in section, of the lower roller, showing it detached from the frame.

Like numerals of reference refer to corresponding parts throughout the different views of the drawings.

The main frame of the mangle is rectangular in shape, as shown, and consists of side pieces 10 and 11 and end pieces 12 and 13, united together in any suitable manner and may be supported on a table or by means of any other suitable support. Secured to the side piece 10 at one of its ends, which I will term the "front" end, is a horizontally-extending bracket 14, in the outer end of which is journaled a shaft 15, which is provided on its rear portion with a worm 16, the threads of which engage worm-threads on the periphery of the arc of a segment 17, which is rigidly mounted on one end of a bar or shaft 18, which is journaled on suitable brackets 19, secured to the side pieces 10 and 11 near their rear ends. As shown in Figs. 1 and 2 of the drawings, the rear end of the shaft 15 is journaled on horizontally-extending projections 20, secured to the outer surface at the rear of the side piece 10, and the front end of said shaft is made angular to receive a crank-handle to be used for turning the same. Horizontally and transversely journaled in the side piece 11, near its front end, is a stub-shaft 21, which has angular-shaped ends, the outer end being so shaped to receive a crank-handle 22 and the inner end being so made to fit in a correspondingly-shaped socket 23 in one end of one of the compressing-rollers 24, the other end of which is provided with a stub-shaft 25, which is journaled in a recess or bearing 26 in the side piece 10, which recess or bearing is open upwardly, so that the said roller may be removed when desired. Secured to the shaft 18 near each of its ends and extending forwardly therefrom is a spring-arm 27, each of which has its front end provided with an eye 28 to receive the stub-shafts 29 on the ends of the adjustable roller 30, which is adapted to lie in parallelism with and above the roller 24, as is clearly shown in Figs. 1 and 2 of the drawings. Mounted on the stub-shaft 21 is a gear 31, which meshes with a similar gear 32, mounted on a shaft 33, transversely and horizontally journaled on the side piece 11 and a bracket 34, which is secured to the outer surface of said piece. The outer end of the shaft 33 is angular in shape to fit in a correspondingly-shaped opening in the end of the crank-handle. It is evident that the gears 31 and 32 may be omitted, in which case the crank-handle 22 may be attached to the shaft 21, when the roller 24, which will be nonrotatable thereon by reason of its angular socket 23 engaging the correspondingly-shaped inner end of said shaft, may be rotated. However, if greater power is desired the gears may be employed and the crank-handle attached to the outer end of the shaft 33, as is shown in Fig. 1 of the drawings. When it is desired to adjust the roller 30, so as to regulate the pressure on the articles wound on the lower roller or when it is desired to remove the latter, the shaft 15 may be turned in the proper direction by means of a crank-handle applied to its front end, which operation, through the instrumentality of the segment-gear 17 engaging the worm 16, will cause the shaft 18 to rock, thereby raising or lowering the roller 30, which, as before stated, is journaled in the front ends of the arms 27, which are preferably made of spring material.

From the foregoing and by reference to the drawings it will be clearly seen and readily understood that the frame should be placed and supported in a horizontal position. When thus supported, the rollers shown in Figs. 1 and 2 will be located one above the other. By turning the shaft 15 in the proper direction it is apparent that the roller 30 may be raised to the position shown by dotted lines in Fig. 2 of the drawings, so that the roller 24 may be removed in order that the article to be smoothed may be partially wound on said roller, when it may be replaced and the adjustable roller 30 lowered, so as to rest on the article with the proper degree of pressure, when by turning the roller 24 by means of the crank 22 the article will be smoothed, after which the adjustable roller may again be raised and the lower roller removed and the article unwound therefrom and folded.

Having thus fully described my invention, what I claim as new, and desire to secure by Letters Patent, is—

The combination with the main frame, of a compressing-roller journaled thereon, means to rotate said roller, a rock-shaft mounted transversely on the frame, a forwardly-extending spring-arm near each of its ends, a roller journaled on the free ends of said arms, a segmental worm-gear on said shaft, a worm-shaft journaled on the frame and meshing with the segmental gear, and means to turn said shaft, substantially as described.

JOHN ZALIKOWSKI.

Witnesses:
CHAS. C. TILLMAN,
A. GUSTAFSON.